US012359960B2

United States Patent
Pedersen et al.

(10) Patent No.: US 12,359,960 B2
(45) Date of Patent: *Jul. 15, 2025

(54) FILTER DEVICE WITH MAGNETIC FLOATER TO STOP OVERFLOW

(71) Applicant: Aqua Tru, LLC, Sherman Oaks, CA (US)

(72) Inventors: Michael Pedersen, Sherman Oaks, CA (US); Chuanzhen Chen, Shenzhen (CN)

(73) Assignee: Aqua Tru, LLC, Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,610

(22) Filed: Feb. 1, 2024

(65) Prior Publication Data

US 2024/0219220 A1    Jul. 4, 2024

Related U.S. Application Data

(63) Continuation of application No. 17/934,316, filed on Sep. 22, 2022, now Pat. No. 11,940,317.

(51) Int. Cl.
*G01F 23/72* (2006.01)
*H01H 36/02* (2006.01)

(52) U.S. Cl.
CPC ............ *G01F 23/72* (2013.01); *H01H 36/02* (2013.01)

(58) Field of Classification Search
None
See application file for complete search history.

(56) References Cited

U.S. PATENT DOCUMENTS

| 6,394,322 | B1 * | 5/2002 | Sekiya | .................... C23C 18/28 222/572 |
| 9,517,958 | B2 | 12/2016 | Spiegel | |
| 11,097,225 | B1 | 8/2021 | Pedersen | |
| 2007/0278141 | A1 | 12/2007 | Patera et al. | |

(Continued)

FOREIGN PATENT DOCUMENTS

| CN | 110330127 A | * 10/2019 | |
| JP | 2000111391 A | * 4/2000 | ............ F24F 3/1423 |

OTHER PUBLICATIONS

Written Opinion of the International Preliminary Examining Authority for International Application No. PCT/US2023/028122, mailed Nov. 24, 2024.

*Primary Examiner* — Justin N Olamit
(74) *Attorney, Agent, or Firm* — Eversheds Sutherland (US) LLP

(57) ABSTRACT

A filter device and methods of use thereof are provided. The filter device may include a pitcher for removably engaging with a base in fluid communication with a fluid source. The pitcher may include a magnetic float assembly, and the base may include a sensor, e.g., a Reed switch, for detecting when a magnetic float of the magnetic float assembly is within a detectable range of the sensor. Upon detection of the magnetic float within the detectable range by the sensor, a controller of the filter device may instruct a pump to pump fluid from the fluid source, through a filtration system of the filter device, and into the pitcher. When the pitcher is full of fluid, the magnetic float will be out of the detectable range of the sensor, such that fluid will stop being transferred from the fluid source to the pitcher.

18 Claims, 10 Drawing Sheets

(56) References Cited

U.S. PATENT DOCUMENTS

| | | | |
|---|---|---|---|
| 2009/0288999 A1* | 11/2009 | Lee .................. | B01D 61/12 210/128 |
| 2010/0208549 A1* | 8/2010 | Kitson ................ | A47J 36/165 222/570 |
| 2016/0279545 A1 | 9/2016 | Bippus et al. | |
| 2018/0022619 A1 | 1/2018 | Spiegel et al. | |

\* cited by examiner

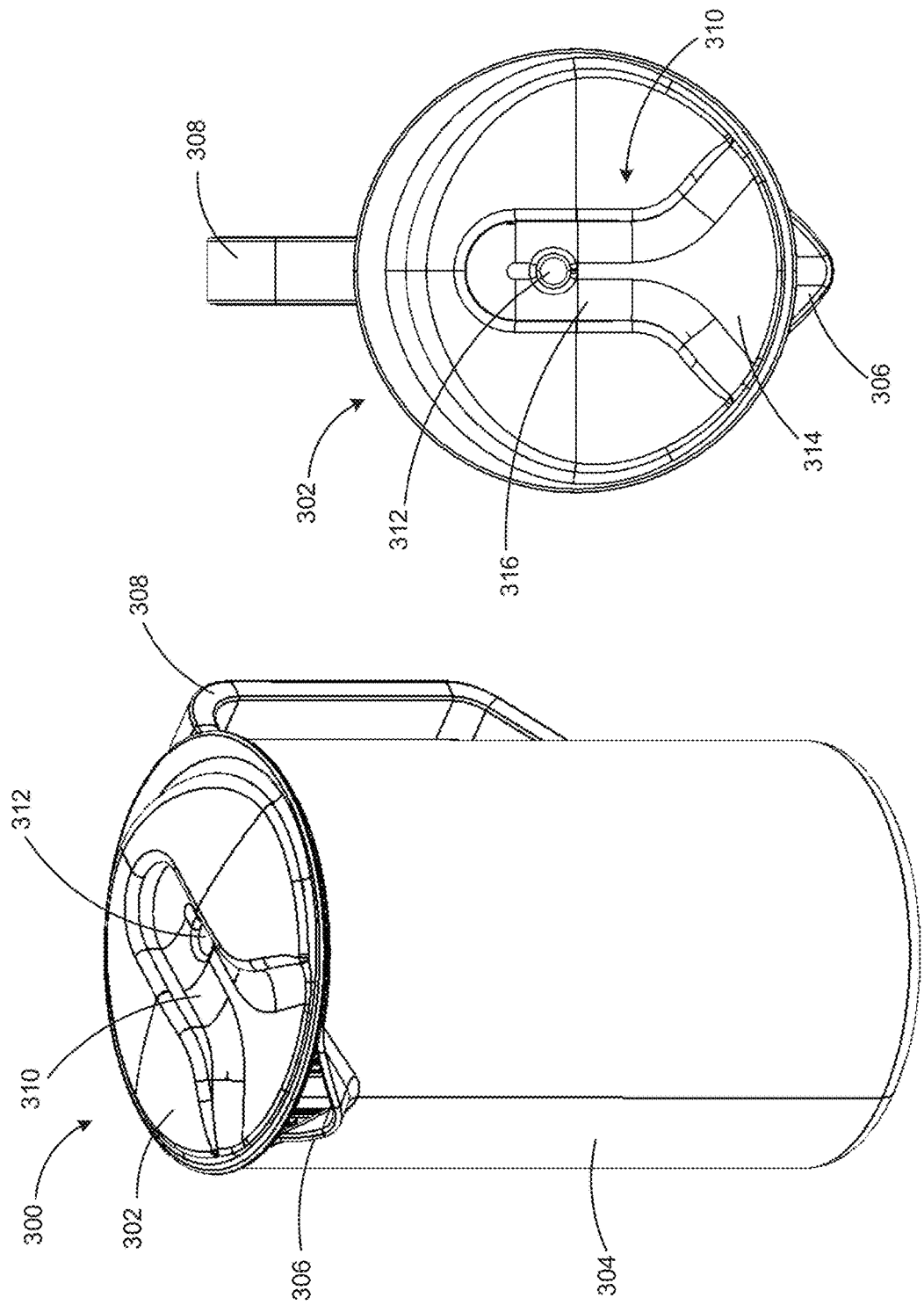

FILTER DEVICE WITH MAGNETIC FLOATER TO STOP OVERFLOW

CROSS REFERENCE TO RELATED APPLICATIONS

This application is a continuation of, and claims priority to, U.S. application Ser. No. 17/934,316 filed Sep. 22, 2022, the disclosure of which is incorporated herein by reference in its entirety.

BACKGROUND

Due to increased levels of toxicity caused by chemicals found within the water supply, water filtration has become widespread within many homes. Point-of-use (POU) water treatment devices are designed to treat small amounts of drinking water for use in the home. These devices can sit on the counter, attach to the faucet, or be installed under the sink. They differ from point-of-entry (POE) devices, which are installed on the water line as it enters the home and treats all the water in the building.

Many households today have Reverse-Osmosis (RO) units installed. Reverse-osmosis devices are usually installed underneath the sink, with the tap water connection plumbed directly to the sink cold water supply line, and a waste water drain line connected directly to the sink p-trap. These devices use a membrane that screens out chemicals, such as chloride and sulfate as well as most other contaminates found in the water supply today. A RO system can remove particles down to 1 Angstrom. However, POU RO systems can waste as much as 3 to 4 gallons of water for every gallon that is treated. This is due to a continuous flow of water that is required across the membrane surface to remove contamination and to keep the membrane from clogging up.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3A illustrates a detachable pitcher of the filter device of FIG. 1A constructed in accordance with the principles of the present disclosure, and FIG. 3B is a top view thereof.

DETAILED DESCRIPTION

Overview

Figure 1A:
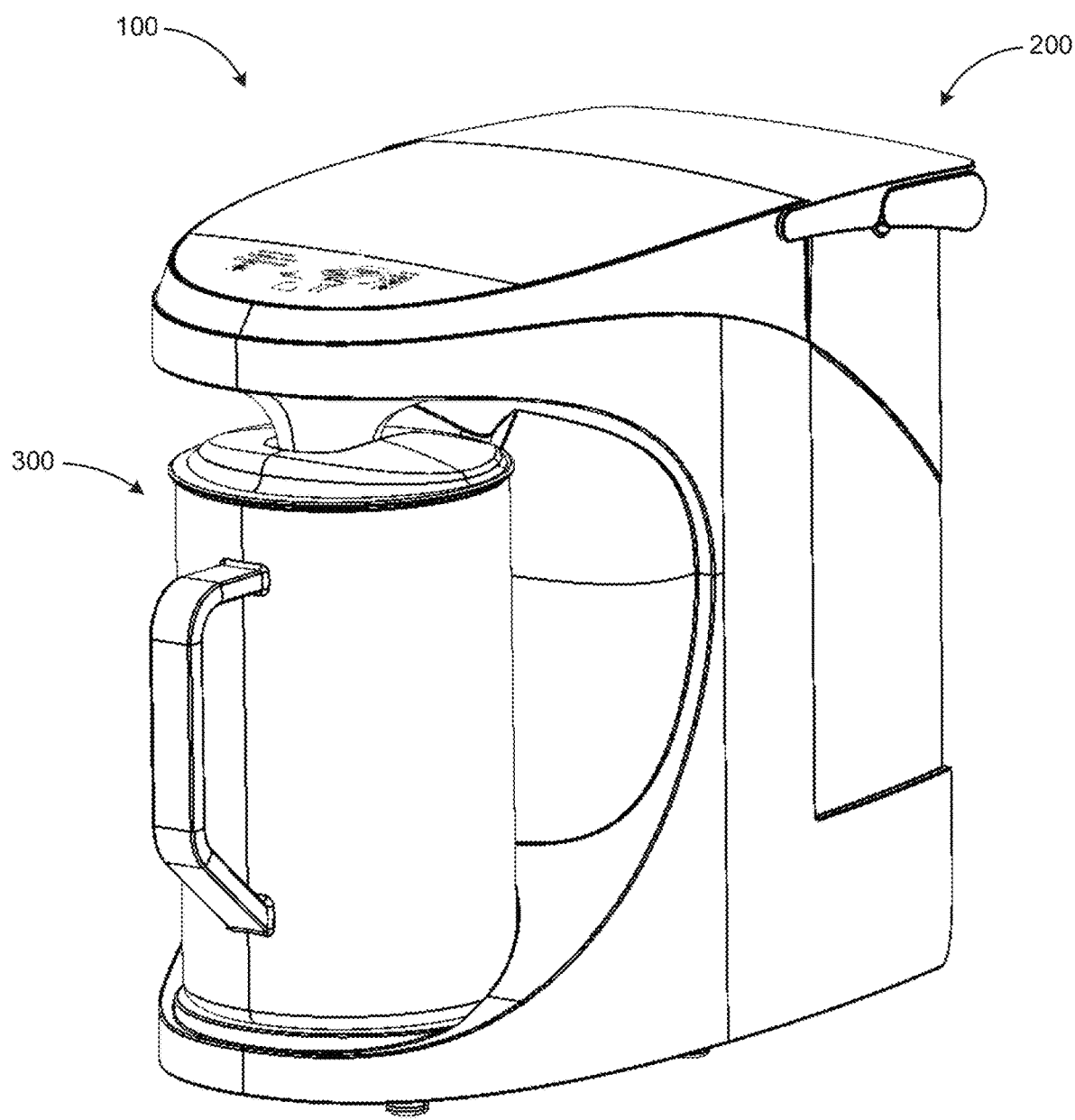
FIG. 1A illustrates a filter device constructed in accordance with the principles of the present disclosure.

A filter device and methods of use thereof are provided. The filter device may include a pitcher for removably engaging with a base in fluid communication with a fluid source. The pitcher may include a pitcher body for holding fluid therein, a lid sized and shaped to cover the pitcher body and having an inlet for receiving fluid into the pitcher body, and a magnetic float assembly having a magnetic float that moves responsive to the level of fluid within the pitcher body. For example, the magnetic float may move between a minimum position, e.g., when the fluid level within the pitcher body is less than the a predefined threshold, and a maximum position, e.g., when the fluid level has reached a predefined capacity of the pitcher body.

The base may include an outlet for transferring fluid to the pitcher when the pitcher is properly aligned with the base, and a receptacle for holding fluid therein. The base further may include a controller having circuitry operatively coupled to a sensor, e.g., a Reed switch, for detecting when the magnetic float of the magnetic float assembly is within a detectable range of the sensor, and a pump. Moreover, the base may include a filtration system such that the controller may cause the pump to pump fluid from the fluid source, through the filtration system, and into then pitcher, e.g., upon detection of the magnetic float by the sensor. As the fluid level within the pitcher reaches the predefined capacity, the magnetic float will reach its maximum position, which is out of the detectable range of the sensor. Accordingly, when the sensor no longer detects the magnetic float, e.g., when the magnetic float is in its maximum position or when the pitcher is not engaged with or not properly aligned with the base such that the magnetic float assembly is not within the detectable range of the sensor, the controller will stop instructing the pump to transfer fluid from the fluid source to the pitcher. The full pitcher may then be removed from the base.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1B:
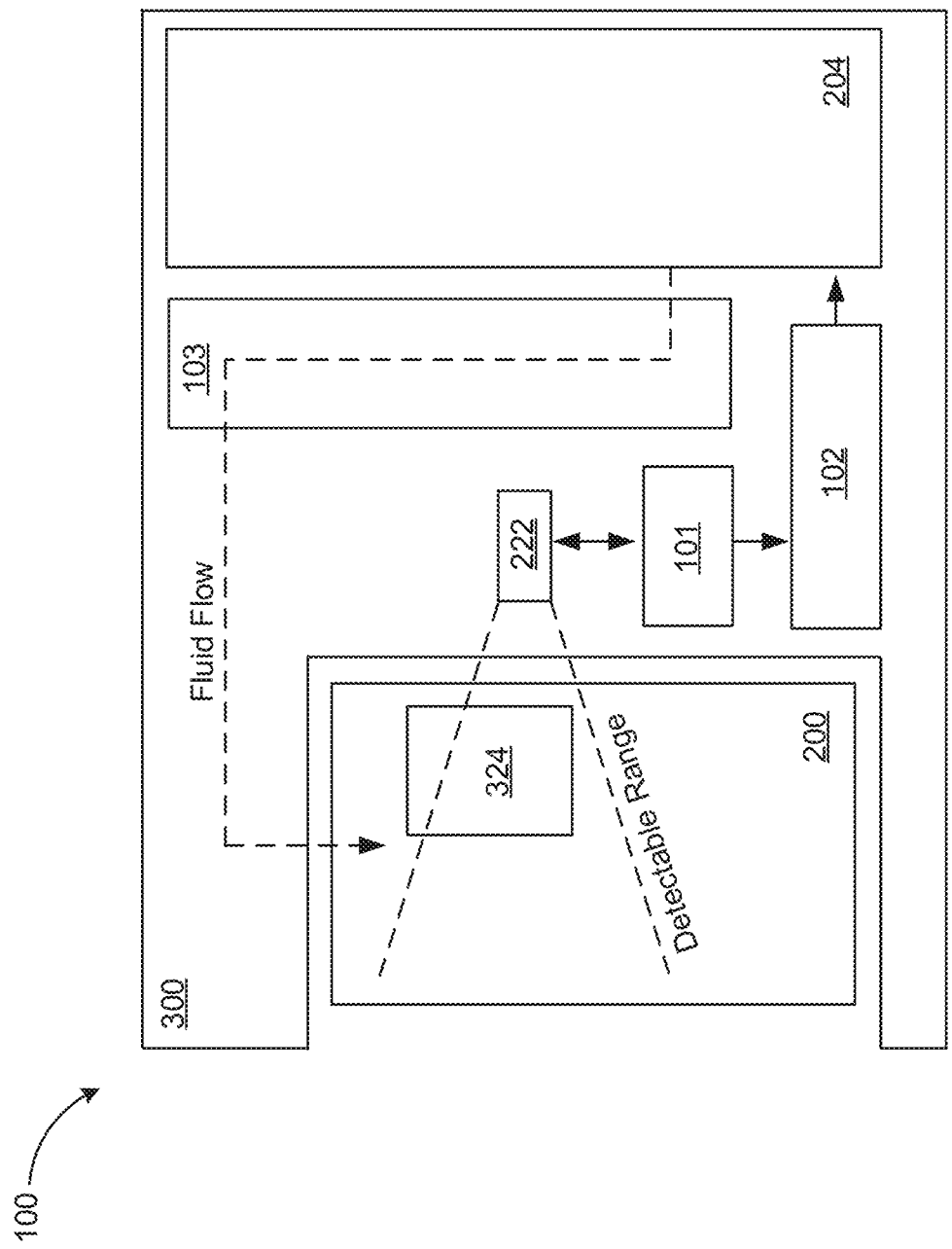
FIG. 1B is a schematic illustrating some of the components of the filter device of FIG. 1A.

Referring now to FIGS. 1A and 1B, an exemplary filter device is provided. As shown in FIGS. 1A and 1B, filter device 100 may include base 200 and detachable pitcher 300. Pitcher 300 may be removably coupled to base 200 for transferring fluid, e.g., filtered water, from base 200 to pitcher 300, when pitcher 300 is coupled to and aligned with base 300, as described in further detail below. Accordingly, base 200 may include a fluid filtration system, e.g., filter 103, as described in U.S. Pat. No. 9,517,958 to Spiegel, the entire contents of which is incorporated herein by reference. When pitcher 300 is properly aligned with base 200, a sensing mechanism, e.g., sensor 222, of base 200 may detect the level of fluid within pitcher 300, e.g., via detection of a magnetic float of magnetic float assembly 324 within a detectable range of sensor 222, such that controller 101 having circuitry operatively coupled to sensor 222 and pump 102 may cause pump 102 to pump fluid from fluid source 204 through filter 103 and into pitcher 300 when the magnetic float is detected within the detectable range. Moreover, controller 101 may cause pump 102 to cease transfer of fluid to pitcher 300 when sensor 222 does not detect the magnetic float of magnetic float assembly 324, thereby indicating that the level of fluid within pitcher 300 has reached a predetermined threshold, e.g., when pitcher 300 is "full", or that pitcher 300 is no longer properly aligned with base 200, e.g., due to removal of pitcher 300 from base 200. In addition, controller 101 may not instruct pump 102 to transfer any fluid from fluid source 204 when pitcher 300 is not coupled to and properly aligned with base 200.

Figures 2A, 2B:
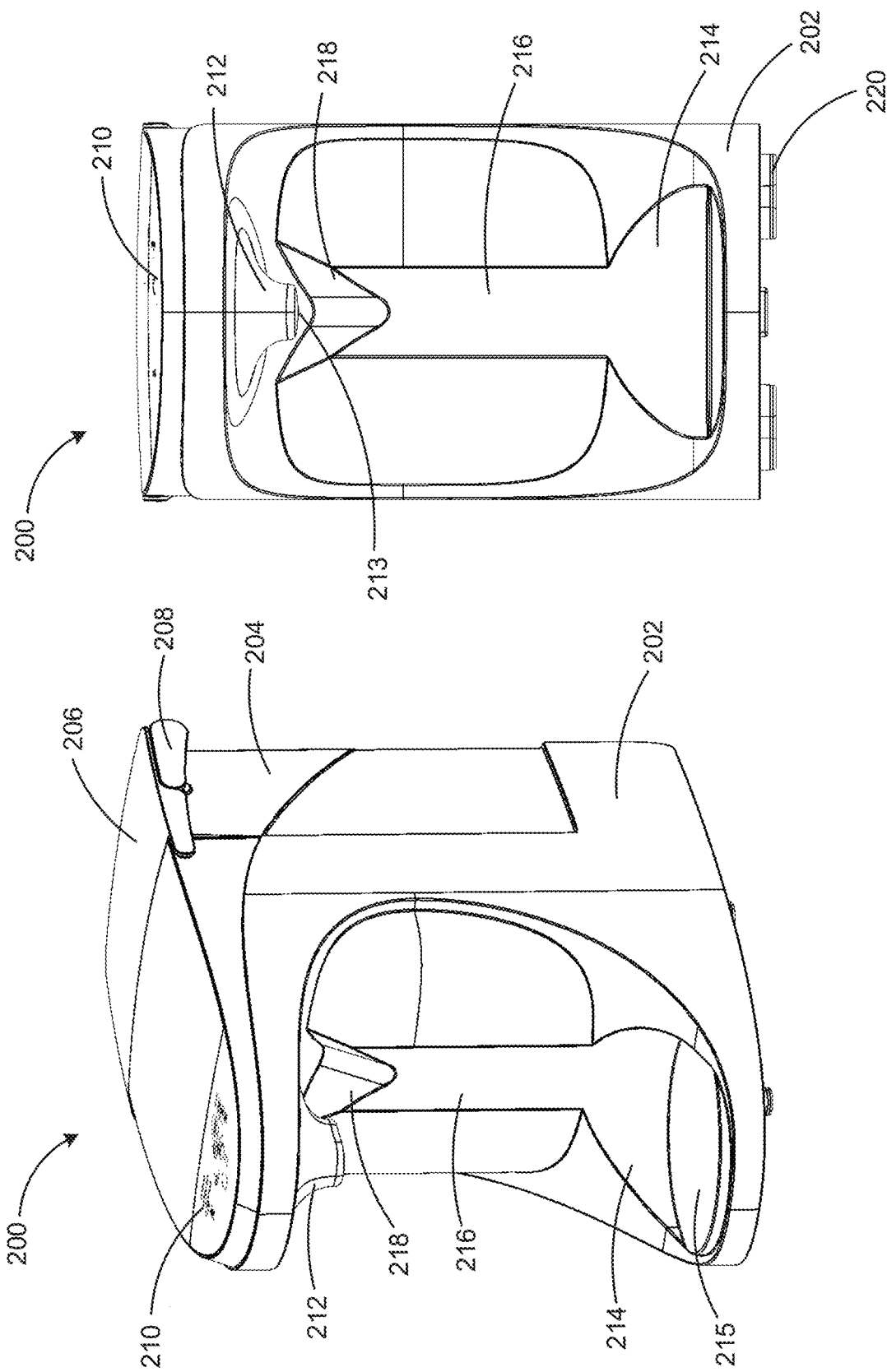
FIGS. 2A and 2B illustrate a base of the filter device of FIG. 1A constructed in accordance with the principles of the present disclosure.

Referring now to FIGS. 2A and 2B, an exemplary filter device base is provided. Base 200 may include base body 202 sized and shaped to fit, e.g., on a countertop, via one or more legs 220, and further may include handle 208 coupled to base body 202, such that a user may easily carry and transport base 200. As shown in FIG. 2A, base 200 may include receptacle 204 for holding fluid therein to be filtered via the filtration system of filter device 100. Receptacle 204 may be removeably coupled to base body 202, e.g., at the rear of base body 202, such that a user may remove receptacle 204 from base body 202 to fill receptacle 204 with fluid when necessary, e.g., when the level of fluid within receptacle 204 is low or empty. For example, receptacle 204 may include receptacle lid 206, which may be lifted and/or removed from receptacle 204 to provide access to the interior of receptacle 204. As will be understood by a person having ordinary skill in the art, base 200 may be fluidicly coupled to another fluid source in addition to or instead of receptacle 204, such that fluid from the fluid source may be pumped directly from the fluid source through the filtration system of base 200 and into pitcher 300.

In addition, base 200 may include user interface 210 operatively coupled to controller 101 having one or more actuators, e.g., buttons, to permit a user to actuate specific functionalities of filter device 100 associated therewith, e.g., on/off, fluid temperature, etc., as well as an optional display for communicating information to the user. For example, the display may inform the user when pitcher 300 is properly aligned with base 200, the status of filter device 100, the current fluid temperature setting, when one or more filters of the filtration system of base 200 needs to be replaced, etc.

Moreover, base body 202 may have a geometry for receiving pitcher 300 in an aligned configuration, such that outlet 213 of base 200 is aligned with an inlet of pitcher 300 so that fluid may be transferred from base 200 to pitcher 300. Accordingly, the geometry of base body 202, e.g., the front side of base body 202, may correspond with the geometry of pitcher 300, e.g., the cylindrical body of pitcher 300 as well as the spout of pitcher 300. For example, as shown in FIGS. 2A and 2B, base body 202 may include first inwardly concaving portion 214 sized and shaped to receive at least a portion of pitcher 300, e.g., the bottom portion of the cylindrical pitcher body of pitcher 300. Concaving portion 214 may extend circumferentially around platform 215 of base body 202. Accordingly, pitcher 300 may be received by base 200 such that at least a portion of pitcher 300 may sit on top of platform 215 within concaving portion 214. Platform 215 may be sized and shaped to completely support pitcher 300, as shown in FIG. 1A. Thus, platform 215 may have a shape and size corresponding with the shape and size of the bottom of pitcher 300.

Referring again to FIGS. 2A and 2B, base 200 further may include second inwardly concaving portion 216 sized and shaped to receive at least a portion of pitcher 300, e.g., the lateral side portion of the cylindrical pitcher body of pitcher 300. Second inwardly concaving portion 216 may have the same radius of curvature as first inwardly concaving portion 214 to accommodate pitcher 300. In addition, base 200 further may include spout receiving portion 218 sized and shaped to receive the spout of pitcher 300, such that when pitcher 300 is properly received by and aligned with base 200, the spout of pitcher 300 will be received by spout receiving portion 218 and the body portion of pitcher 300 will be received by first and second inwardly concaving portions 214, 216. Accordingly, spout receiving portion 218 may have a geometry that corresponds to the geometry of the spout of pitcher 300.

As shown in FIGS. 2A and 2B, base 200 may include protrusion 212 extending from base body 202. For example, protrusion 212 may extend from the underside of an upper portion of base body 202 toward platform 215, e.g., from a surface opposite user interface 210. As described in further detail below, protrusion 212 may be sized and shaped to be received in a corresponding groove of the lid of pitcher 300, such that pitcher 300 may be securely received by base 200. For example, protrusion 212 may have a cross-sectional area that decreases from base body 202 toward platform 215, e.g., the outer lateral surface of protrusion 212 may concave inward. Moreover, base 200 may include outlet 213 disposed on protrusion 212, which is in fluid communication with a fluid source, e.g., via a pump. Accordingly, when protrusion 212 is properly received by the groove of pitcher 300, outlet 213 will be aligned with an inlet on the lid of pitcher 300, as described in further detail below. Thus, first and second inwardly concaving portions 214, 216, spout receiving portion 218, and protrusion 212, together facilitates proper alignment of pitcher 300 and base 200 during operation of filter device 100.

Figure 2C:
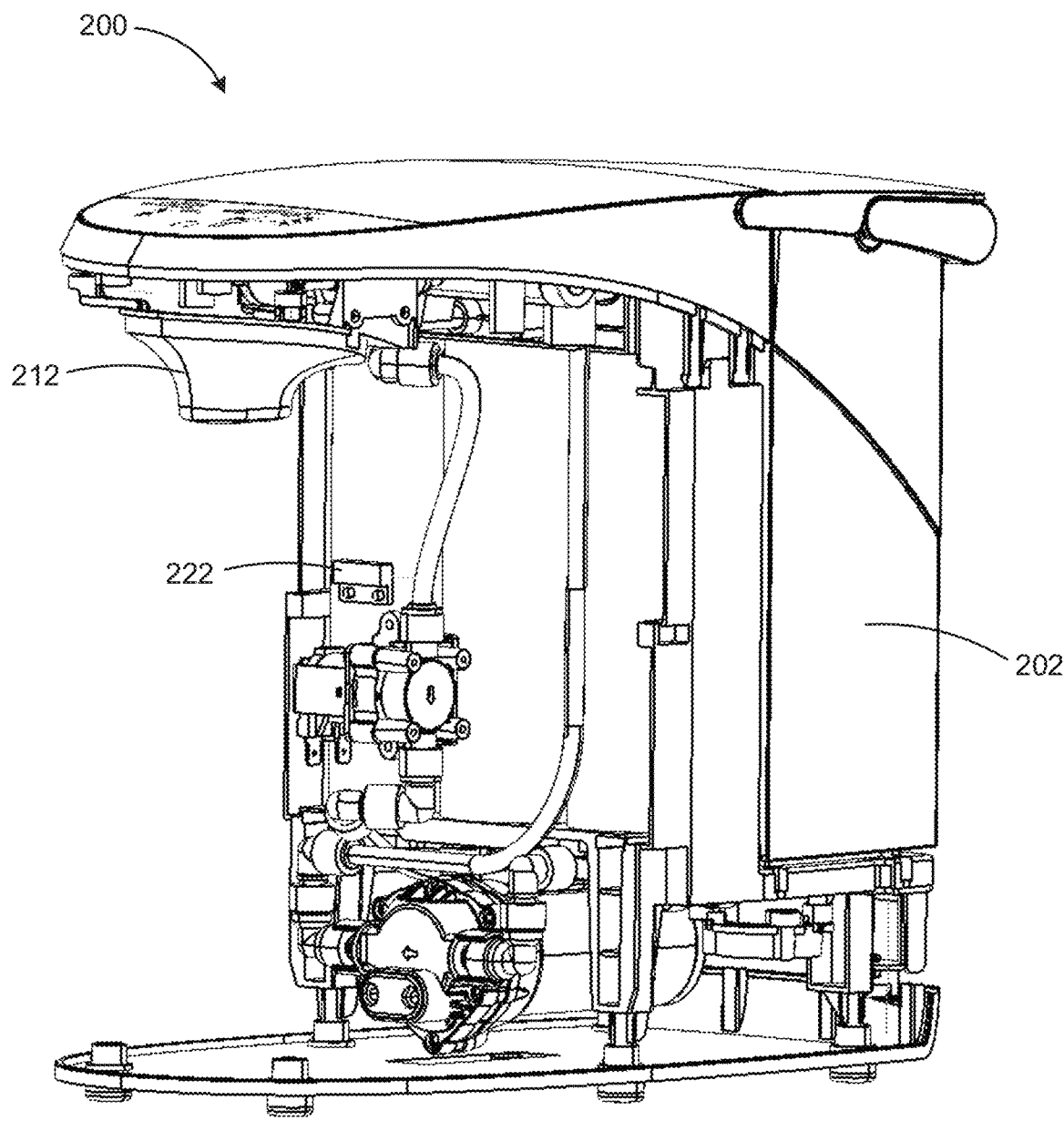
FIG. 2C illustrates an interior of the base of FIGS. 2A and 2B.

Referring now to FIG. 2C, an interior of base 200 is described. As shown in FIG. 2C, base 200 may include sensor 222, e.g., a Reed switch. Sensor 222 may be configured to detect a magnetic field, e.g., the magnetic field of the magnetic float of pitcher 300, within a predefined detectable range. Accordingly, sensor 222 may determine whether pitcher 300 is properly engaged and aligned with base 200, e.g., by detecting whether the magnetic float is within the detectable range of sensor 222, as described in further detail below. Therefore, as will be understood by a person having ordinary skill in the art, sensor 222 may be positioned within base body 202, such that the detectable range of sensor 222 is capable of accurately detecting the magnetic float when pitcher 300 is received by base 200 in the aligned configuration. For example, sensor 222 is preferably positioned toward the front side of base body 202, e.g., the side of base 200 that faces pitcher 300 when pitcher 300 is received by base 200.

Referring now to FIGS. 3A and 3B, an exemplary pitcher is provided. Pitcher 300 may include pitcher body 304 and lid 302, which covers the opening at the top of pitcher body 304. Pitcher body 304 may have an interior cavity for holding a fluid therein, and a cylindrical tubular shape with a geometry that corresponds with the geometries of first and second inwardly concaving portions 214, 216, and spout receiving portion 218, as described above. Alternatively, pitcher body 304 may have a different geometry, such that first and second inwardly concaving portions 214, 216, and spout receiving portion 218 may also have a corresponding geometry for receiving pitcher 300 in an aligned configuration. As shown in FIGS. 3A and 3B, pitcher body 304 further may include spout 306 sized and shaped to permit fluid to flow out of pitcher body 304 in a controlled and precise manner. In addition, pitcher body 304 may have handle 308 to permit a user to easily hold, lift, and move pitcher body 304.

Lid 302 may be removeably coupled to pitcher body 304, such that the interior cavity of pitcher body 304 may be periodically cleaned. Alternatively, lid 302 may be fixedly coupled to pitcher body 304. As shown in FIGS. 3A and 3B, the upper surface of lid 302 may include groove 310, sized and shaped to receive protrusion 212 of base 200, as described above. For example, groove 310 may include first receiving portion 314, which leads into second locking portion 316. First receiving portion 314 may have a larger width than second locking portion 316, such that first receiving portion 314 may receive protrusion 212 within a wider range of insertion angles. As the user inserts pitcher 300 within base 200, first receiving portion 314 guides protrusion 212 toward and into second locking portion 316. Second locking portion 316 is sized and shaped to securely receive protrusion 212, while preventing at least some movement of protrusion 212 while pitcher 300 is properly aligned with base 200. For example, second locking portion 316 may prevent rotational movement of pitcher 300 in the aligned configuration. Moreover, second locking portion 316 may prevent further movement of pitcher 300 toward base 200 in the aligned configuration, while permitting pitcher 300 to be retracted in the opposition direction to disengage with base 200. Accordingly, second locking portion 316 may have a geometry that corresponds with the geometry of at least a portion of protrusion 212, e.g., at least three sides of protrusion 212.

In addition, lid 302 may include inlet 312 disposed in second locking portion 316. Inlet 312 may be sized and shaped to receive fluid from outlet 213 of base 200. For example, inlet 312 may have a diameter equal to or greater than outlet 213. Accordingly, in the aligned configuration when protrusion 212 is completely received by second locking portion 316, inlet 312 will be aligned with and in fluid communication with outlet 213.

Figure 4C:
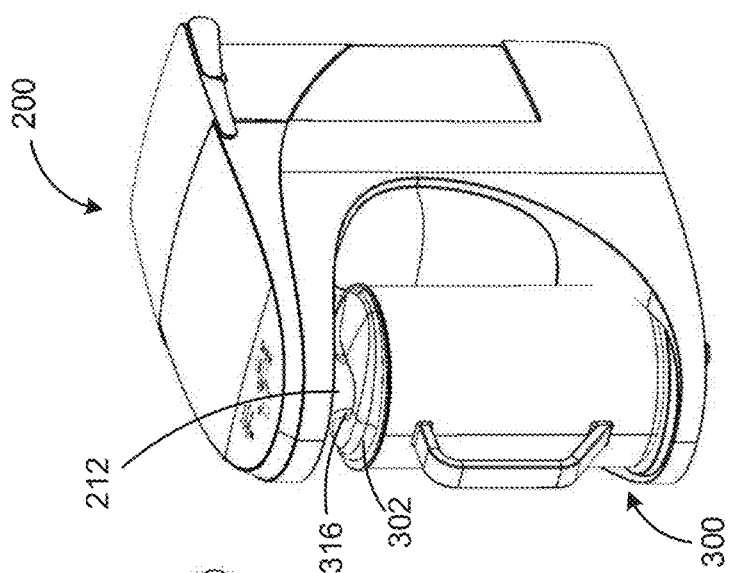
FIGS. 4A to 4C illustrate insertion of the detachable pitcher to the base in accordance with the principles of the present disclosure.
Figure 4B:
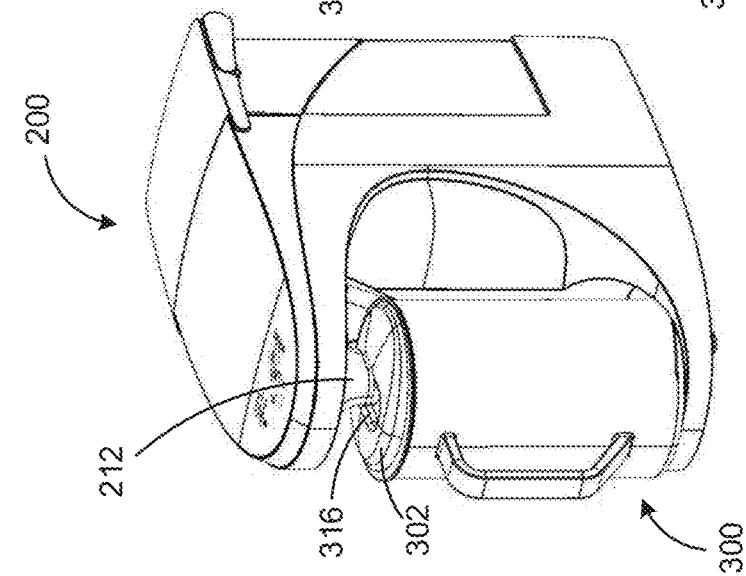
Figure 4A:
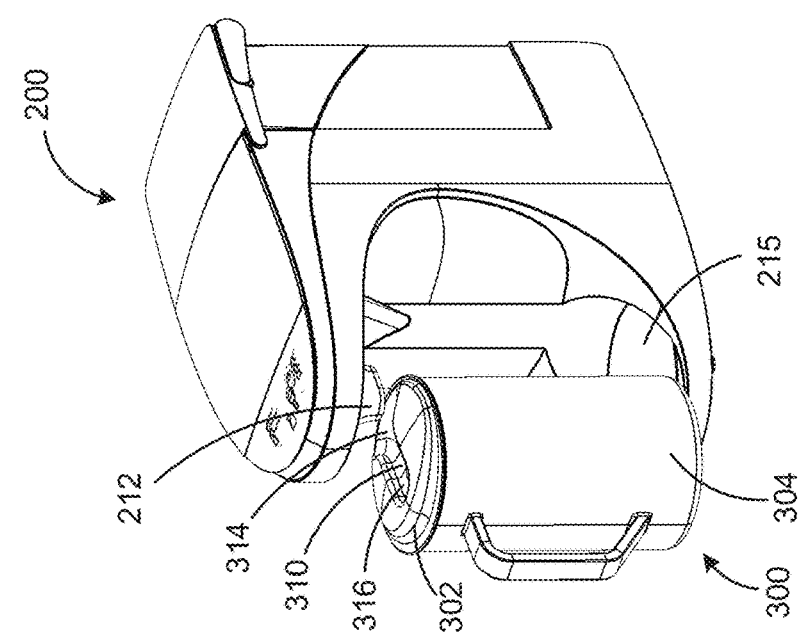

FIGS. 4A to 4C illustrate insertion of pitcher 300 into base 200 for operation of filter device 100. As shown in FIG. 4A, the user may position pitcher 300 relative to base 200 such that protrusion 212 is received by first receiving portion 314. As described above, due to the large width of first receiving portion 314, protrusion 212 may be received by first receiving portion 314 at various insertion angles of pitcher 300. For example, pitcher 300 may be inserted directly toward base 200 as shown in FIG. 4A, or alternatively, may be inserted at an angle of up to, e.g., 45 degrees or more, from the right or left side of base 200. As shown in FIG. 4B, as pitcher 300 is inserted into base 200, first receiving portion 314 guides protrusion 212 toward second locking portion 316, thereby causing pitcher 300 to be properly aligned with base 200, such that further insertion of pitcher 300 is in the direction directly toward base 200. Moreover, as shown in FIG. 4B, pitcher body 304 may be inserted into base 200 such that pitcher body 304 sits on top of platform 215. FIG. 4C shows pitcher 300 completely inserted within base 200 in the aligned configuration, such that inlet 312 is aligned with and in fluid communication with outlet 213. As described above, in the aligned configuration shown in FIG. 4C, the magnetic float of pitcher 300 is aligned with sensor 222 of base 300, such that sensor 222 may detect the magnetic float when the magnetic float is within the detectable range of sensor 222 in the aligned configuration.

Figure 5A:
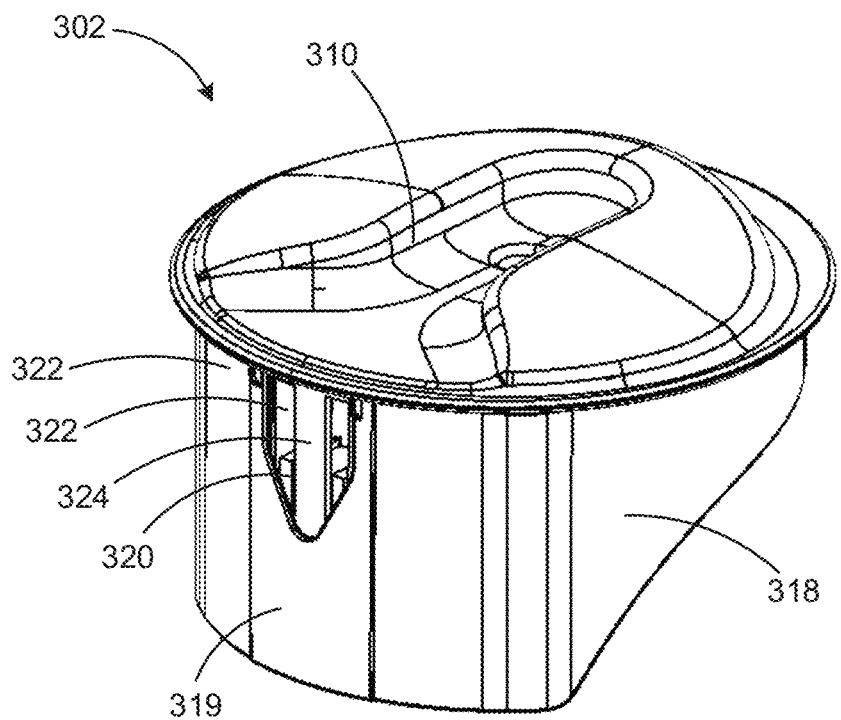
FIGS. 5A and 5B illustrate a lid of the detachable pitcher of FIG. 3A, constructed in accordance with the principles of the present disclosure.
Figure 5B:
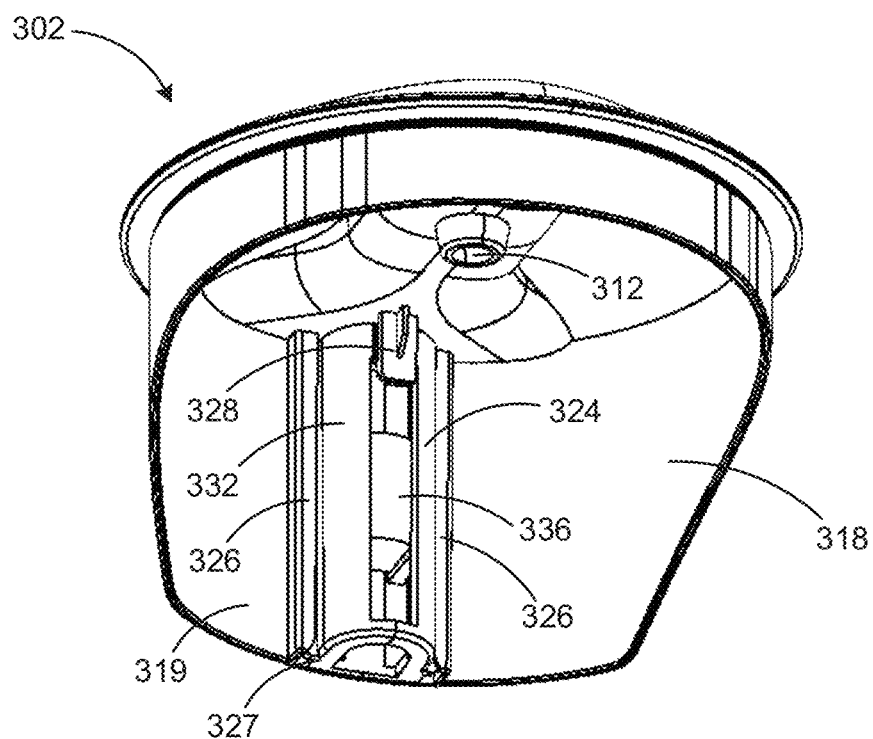

Referring now to FIGS. 5A and 5B, an exemplary lid of pitcher 300 is provided. Lid 302. As described above, lid 302 may include groove 310 sized and shaped to receive protrusion 212 as pitcher 300 is received by base 200, such that pitcher 300 is aligned with base 200 during insertion. As shown in FIGS. 5A and 5B, lid 302 may include surface 318 extending downward, e.g., toward the bottom of pitcher body 304 when lid 302 is coupled to pitcher body 304, from a bottom surface of lid 302. Surface 318 may extend circumferentially along lid 302 near the outer edge of lid 302, with an outer diameter that is equal to or slightly less than the diameter of the interior cavity of pitcher 304. Accordingly, when lid 302 is coupled to pitcher body 304, surface 318 is inserted into the interior cavity of pitcher body 304 such that surface 318 may be in contact or nearly in contact with the inner wall of pitcher body 304. As shown in FIG. 5A, surface 318 may include spout outlet 322 for providing fluid communication between the interior cavity of pitcher body 304 and spout 306 when lid 302 is coupled to pitcher body 304. Accordingly, spout outlet 322 may be sized and shaped to permit fluid to be transferred out of pitcher body 304 toward spout 306 in a controlled manner.

As shown in FIGS. 5A and 5B, surface 318 may include extended portion 319 having a length sufficient to accommodate magnetic float assembly 324. As shown in FIG. 5A, spout outlet 322 may be positioned on extending portion 319. Extending portion 319 may extend circumferentially along only a portion of the outer edge of lid 302, e.g., adjacent to first receiving portion 314 of lid 302, such magnetic float assembly 324 is positioned toward sensor 222 when pitcher 300 is properly aligned with base 300 in the aligned configuration. In some embodiments, extending portion 319 may extend along a smaller or larger portion of the outer edge of lid 302 than is shown in FIGS. 5A and 5B, e.g., completely along the outer edge of lid 302.

As shown in FIG. 5B, extending portion 319 may include retention members, e.g., rails 326, ledge 327, and clip 328, for retaining magnetic float assembly 324 relative to lid 302. Rails 326 may include a pair of guide rails that extend vertically along extended portion 319 to support the sides of magnetic float assembly 324. During manufacturing of lid 302, magnetic float assembly 324 may slide into position along rails 326 until clip 328 engages with and locks magnetic float assembly 324 in position. Ledge 327 may be coupled to rails 326 and/or magnetic float assembly 324 to support the bottom of magnetic float assembly 324.

Alternatively, magnetic float assembly 324 may be integrally formed with lid 302. As shown in FIG. 5B, magnetic float assembly 324 may include frame 332 and magnetic float 336 moveably disposed within frame 332. Accordingly, the retention members of lid 302 may be configured to retain frame 332 of magnetic float assembly 324.

Figure 6A:
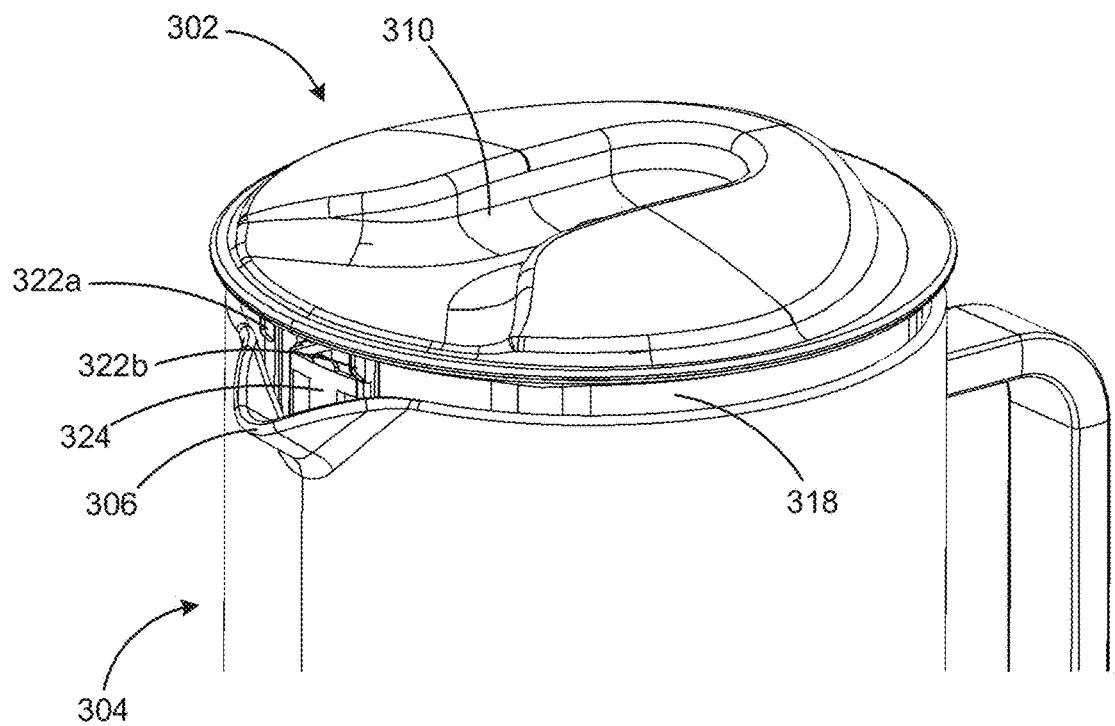
FIG. 6A illustrates insertion of the lid to a pitcher body of the detachable pitcher in accordance with the principles of the present disclosure.
Figure 6B:
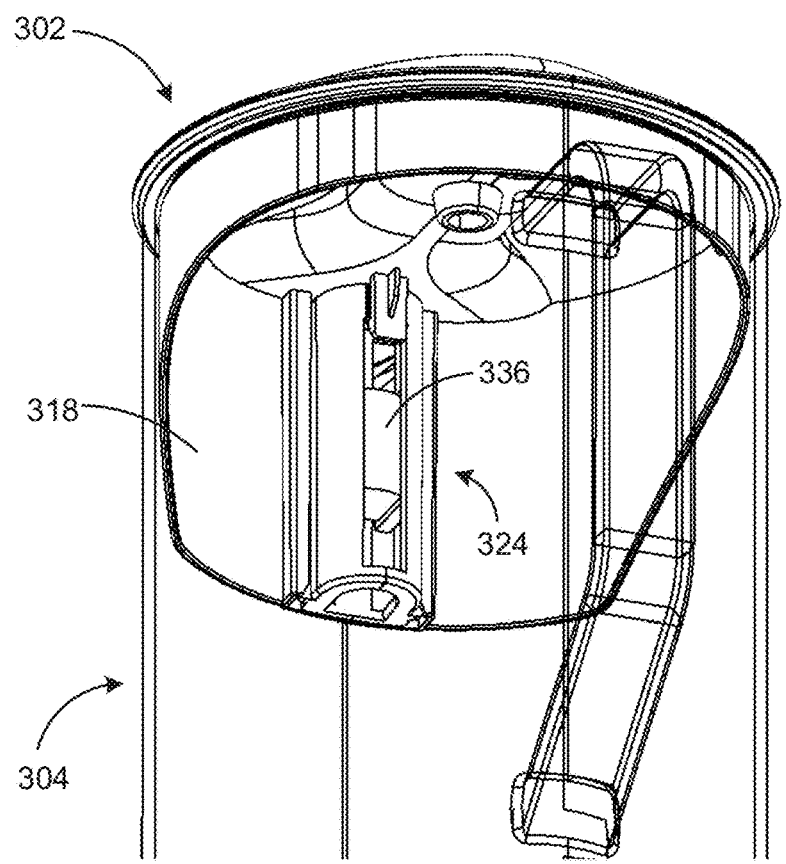
FIG. 6B illustrates the lid attached to the pitcher body.

FIGS. 6A and 6B illustrate insertion of lid 302 into pitcher body 304. As shown in FIG. 6A, lid 302 may include an alignment feature, e.g., nubs 322a, 322b, for facilitating proper alignment of lid 302 with pitcher body 304 so that magnetic float assembly 324 may be properly aligned with pitcher body 304 and with sensor 222 when pitcher 300 is inserted into base 200. For example, lid 302 may include a pair of nubs 322a, 322b adjacent to first receiving portion 314 of groove 310, and spaced apart such that nubs 322a, 322b may be aligned with the opening of spout 306 of pitcher body 304. Accordingly, when lid 302 is completely engaged with pitcher body 304, nubs 322a, 322b will sit within the opening of spout 306, thereby preventing rotation of lid 302 relative to pitcher body 304 to ensure that lid 302, and accordingly magnetic float assembly 324, are in proper alignment with pitcher body 304 during operation of filter device 100. For example, nub 322a may prevent rotation of lid 302 in a clockwise direction relative to pitcher body 304, and nub 322b may prevent rotation of lid 302 in a counter-clockwise direction relative to pitcher body 304. Thus, nubs 322a, 322b may facilitate proper insertion of lid 302 into pitcher body 304 as nubs 322a, 322b will prevent complete insertion of lid 302 into pitcher body 304 unless nubs 322a, 322b are aligned with spout 306. FIG. 6B illustrates lid 302 properly engaged with pitcher body 304.

Figure 7B:
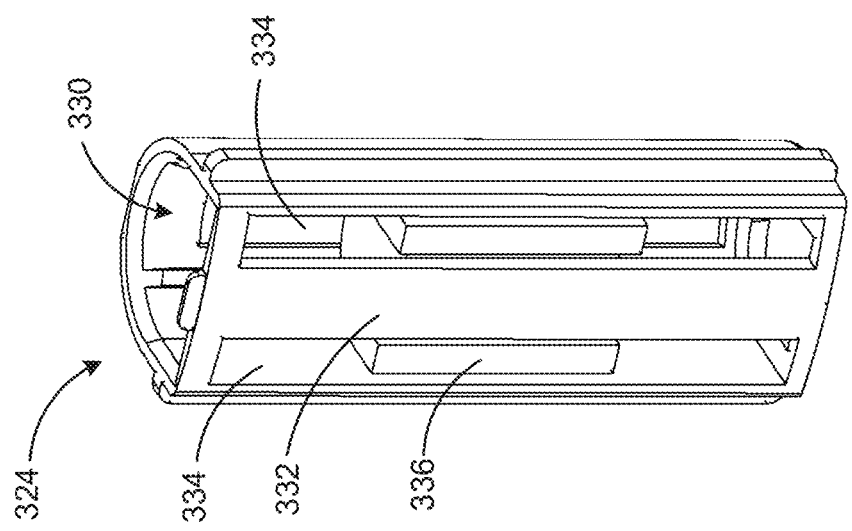
FIGS. 7A and 7B illustrate a magnetic float of the filter device constructed in accordance with the principles of the present disclosure.
Figure 7A:
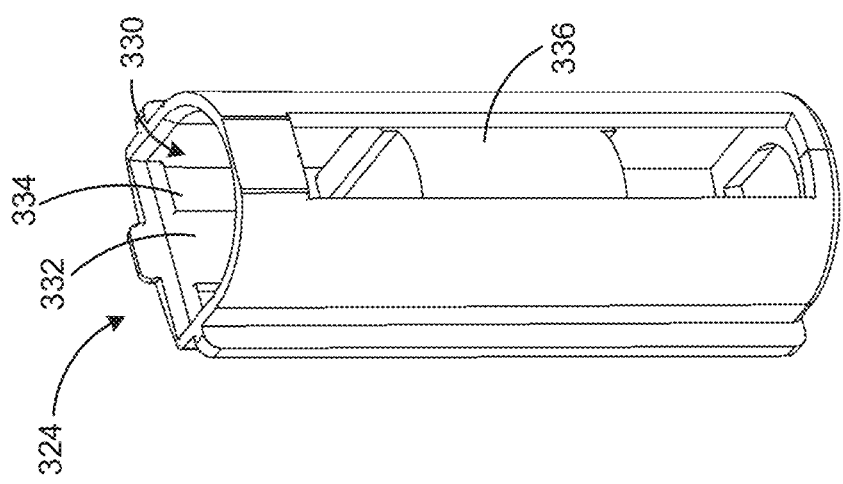

Referring now to FIGS. 7A and 7B, an exemplary magnetic float assembly is provided. Magnetic float assembly 324 may include frame 332 and magnetic float 336 moveably disposed within frame 332. Frame 332 may include cavity 330 sized and shaped to receive magnetic float 336 therein, such that magnetic float may move, e.g., vertically, within cavity 330 of frame 332. Moreover, frame 332 may include one or more vertically extending openings 334 for receiving at least a portion of magnetic float 336 to guide and stabilize magnetic float 336 as magnetic float 336 moves within cavity 330 of frame 332. Accordingly, magnetic float 336 may include one or more portions for slidably engaging with openings 334. As shown in FIG. 7B, magnetic float 336 may have a U-shape for engaging with openings 334. Alternatively, magnetic float 336 need not engage with frame 334, and may freely move within cavity 330 of frame 332 responsive to the level of fluid within pitcher body 304.

Figure 8B:
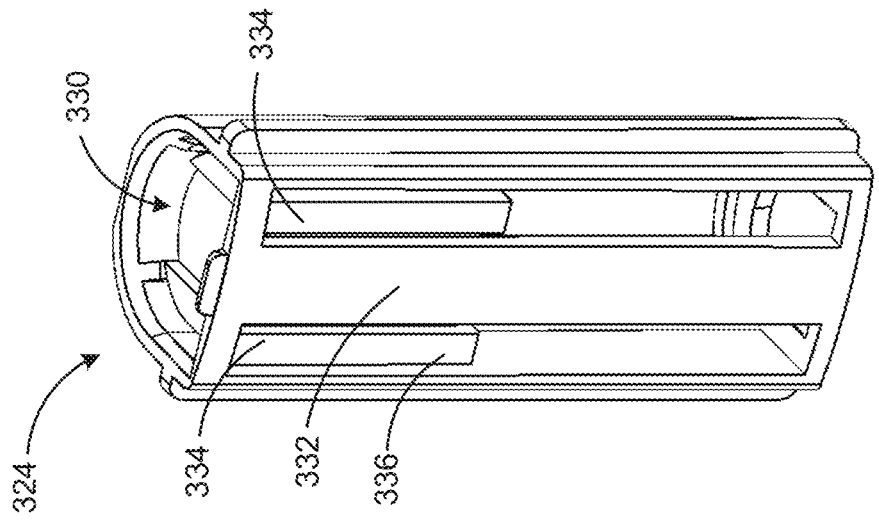
FIGS. 8A and 8B illustrate different phases of the magnetic float of FIGS. 7A and 7B during operation of the filter device in accordance with the principles of the present disclosure.
Figure 8A:
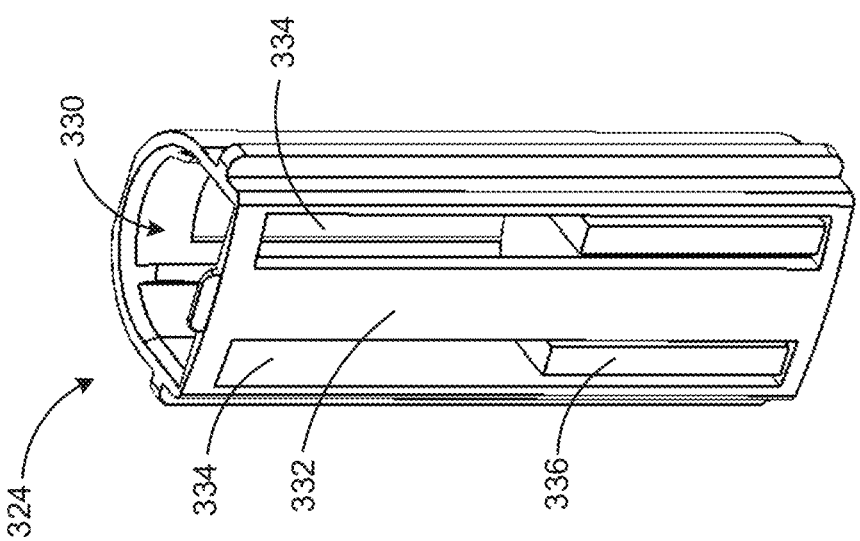

Magnetic float 336 may be made of, e.g., a ferrous material, such that magnetic float 336 may have a magnetic field that is detectable by sensor 222 when magnetic float 336 is within the detectable range of sensor 222. Moreover, magnetic float 336 has a density selected such that magnetic float 336 may float on the fluid within pitcher body 304. Accordingly, when the level of fluid within pitcher body 304 is below the bottom of magnetic float assembly 324, e.g., ledge 327, magnetic float 336 may not be in contact with the fluid, and thus will sit at the bottom of frame 332 within cavity 330 in a minimum position, as shown in FIG. 8A. At the minimum position, magnetic float 336 will be within the detectable range of sensor 222, such that sensor 222 may detect magnetic float 336. Accordingly, upon detection of magnetic float 336 by sensor 222, sensor 222 may generate one or more signals indicative of the detection of magnetic float 336, and transmit the one or more signals to controller 101, which may be operatively coupled to sensor 222 and pump 102. Upon receipt of the one or more signals from sensor 222, controller 101 may instruct pump 102 to cause fluid to be transferred from a fluid source, e.g., receptacle 204, through filter 103, and into pitcher body 304 via outlet 213 of base 200 and inlet 312 of pitcher 300.

As the fluid level within pitcher body 204 increases above the bottom of magnetic flow assembly 324, the fluid will cause magnetic float 336 to move vertically upward within cavity 330 due to the floatation properties of magnetic float 336. As shown in FIG. 1B, the detectable range of sensor 222 may not include the uppermost portion of magnetic float assembly 324, such that when magnetic float 336 floats to the top of cavity 330 in a maximum position responsive to the rising fluid level within pitcher body 304, as shown in FIG. 8B, magnetic float 336 may be out of the detectable range of sensor 222, such that sensor 222 cannot detect magnetic float 336 in the maximum position. Accordingly, when magnetic float 336 is in the maximum position, sensor 222 will not generate any signals indicative of detection of magnetic float 336 for transmission to controller 101, such that controller 101 will stop instructing pump 102 to pump fluid from receptacle 204 to pitcher 300. The "full" pitcher 300 may then be removed from base 200. In accordance with the principles of the present disclosure, pitcher 300 may be removed at any time during operation of filter device 100, e.g., as fluid is being transferred from base 200 to pitcher 300, at which time of removal magnetic float 336 will no longer be within the detectable range of sensor 222, such that fluid will cease being pumped from receptacle 204 by pump 102.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims. Certain terms are used throughout the description, and claims refer to particular system components. As one skilled in the art will appreciate, components may be referred to by different names. This document does not intend to distinguish between components that differ in name, but not function.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A filter device comprising:
    a pitcher comprising:
        a pitcher body configured to hold liquid;
        a lid configured to cover the pitcher body, the lid comprising an inlet; and
        a magnetic float assembly comprising a magnetic float configured to move responsive to a level of fluid within the pitcher body; and
    a base comprising a first inwardly concaving portion configured to removeably receive a bottom of the pitcher body such that the pitcher is configured to be aligned with the base in an aligned configuration, a second portion comprising a sidewall configured to receive an outer surface of the pitcher body, and a cavity extending into the sidewall configured to receive a spout of the pitcher, the base further comprising:
        an outlet;
        a pump operatively coupled to a fluid source;
        a sensor comprising a detectable range, and configured to detect the magnetic float in the aligned configuration when the magnetic float is within the detectable range; and
        circuitry operatively coupled to the pump and the sensor, and configured to cause the pump to transfer fluid from the fluid source to the pitcher body via the outlet and the inlet only when the sensor detects the magnetic float within the detectable range.

2. The filter device of claim 1, wherein the lid is configured to removeably cover the pitcher body.

3. The filter device of claim 2, wherein the pitcher body comprises a spout, and wherein the lid comprises an alignment feature configured to be received by the spout to align the lid and the pitcher body and to prevent rotational movement of the lid relative to the pitcher body.

4. The filter device of claim 3, wherein the alignment feature comprises a pair of nubs.

5. The filter device of claim 1, wherein the magnetic float assembly is coupled to lid.

6. The filter device of claim 5, wherein the lid comprises a surface vertically extending from the lid toward the pitcher body, and wherein the magnetic float assembly is coupled to the surface.

7. The filter device of claim 6, wherein the surface comprises a plurality of engagers configured to retain the magnetic float assembly.

8. The filter device of claim 6, wherein the surface comprises a geometry that corresponds to an inner surface of the pitcher body.

9. The filter device of claim 1, wherein the magnetic float assembly comprises a frame configured to slidably receive the magnetic float.

10. The filter device of claim 1, wherein the magnetic float is configured to move between a minimum position and a maximum position responsive to the level of fluid within the pitcher body, and wherein, in the maximum position, the magnetic float is not within the detectable range.

11. The filter device of claim 1, wherein the magnetic float is configured to float on fluid within the pitcher body.

12. The filter device of claim 1, wherein the base comprises a receptacle comprising the fluid source.

13. The filter device of claim 1, wherein the lid comprises a groove.

14. The filter device of claim 13, wherein the groove comprises a first receiving portion and a second locking portion configured to prevent at least some movement of the pitcher relative to the base in the aligned configuration.

15. The filter device of claim 13, wherein the outlet is disposed on the protrusion, and the inlet is disposed in the groove, such that the inlet is in fluid communication with the outlet in the aligned configuration.

16. A method for providing filtered fluid, the method comprising:
- receiving, by a base comprising a first inwardly concaving portion, a second portion, and a cavity, a pitcher such that the pitcher is aligned with the first inwardly concaving portion and the second portion of the base in an aligned configuration;
- detecting, by a sensor, whether a magnetic float coupled to the pitcher is within a detectable range of the sensor, the magnetic float configured to move responsive to a level of fluid within the pitcher;
- causing, by a controller, a pump to transfer fluid from a fluid source to the pitcher when the magnetic float is within the detectable range of the sensor; and
- ceasing, by the controller, transfer of fluid from the fluid source to the pitcher via the pump when the magnetic float is not within the detectable range of the sensor;
- wherein the first inwardly concaving portion is configured to removeably receive a bottom of the pitcher body, the second portion comprises a sidewall configured to receive an outer surface of the pitcher body, and the cavity extends into the sidewall and is configured to receive a spout of the pitcher.

17. The method of claim 16, wherein receiving, by the base, the pitcher such that the pitcher is aligned with the base in an aligned configuration comprises slidably receiving a protrusion of the base by a groove of a lid of the pitcher.

18. The method of claim 16, wherein the magnetic float is configured to move between a minimum position and a maximum position responsive to the level of fluid within the pitcher, and wherein, in the maximum position, the magnetic float is not within the detectable range.

\* \* \* \* \*